United States Patent
Chen

(10) Patent No.: US 10,824,901 B2
(45) Date of Patent: Nov. 3, 2020

(54) IMAGE PROCESSING OF FACE SETS UTILIZING AN IMAGE RECOGNITION METHOD

(71) Applicant: GUANGDONG OPPO MOBILE TELECOMMUNICATIONS CORP., LTD., Dongguan, Guangdong (CN)

(72) Inventor: Deyin Chen, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 86 days.

(21) Appl. No.: 16/191,689

(22) Filed: Nov. 15, 2018

(65) Prior Publication Data
US 2019/0164004 A1 May 30, 2019

(30) Foreign Application Priority Data
Nov. 30, 2017 (CN) .......................... 2017 1 1242740

(51) Int. Cl.
G06K 9/00 (2006.01)
G06K 9/46 (2006.01)
G06T 3/40 (2006.01)

(52) U.S. Cl.
CPC ....... *G06K 9/4609* (2013.01); *G06K 9/00255* (2013.01); *G06K 9/00295* (2013.01); *G06T 3/4092* (2013.01)

(58) Field of Classification Search
CPC ............ G06K 9/4609; G06K 9/00255; G06K 9/00295; G06T 3/4092
See application file for complete search history.

(56) References Cited

U.S. PATENT DOCUMENTS

2012/0250950 A1* 10/2012 Papakipos .......... G06K 9/00288
382/118
2012/0314915 A1* 12/2012 Ochi .................. G06K 9/00677
382/118
(Continued)

FOREIGN PATENT DOCUMENTS

CN 103034714 4/2013
CN 103207870 7/2013
(Continued)

OTHER PUBLICATIONS

EPO, Office Action for EP Application No. 18209199, dated Mar. 13, 2019 dated Mar. 13, 2019.
(Continued)

*Primary Examiner* — Pakee Fang
(74) *Attorney, Agent, or Firm* — Hodgson Russ LLP

(57) ABSTRACT

Embodiments of the present disclosure provide an image processing method. The method includes: acquiring a first face set by performing face recognition on a first image set according to a first recognition model; in response to detecting a connection to a network, receiving a second face set sent by a server, the second face set being acquired by the server through face recognition on images in a second image set according to a second recognition model, a recognition precision of the first recognition module being lower than a recognition precision of the second recognition model; performing image matching on the images in the first image set and the images in the second image set; processing the first face set according to the second face set and a result of the image matching; and classifying the first image set according to the processed first face set.

20 Claims, 6 Drawing Sheets

(56) References Cited

U.S. PATENT DOCUMENTS

| | | | | |
|---|---|---|---|---|
| 2013/0027569 A1* | 1/2013 | Parulski | ............ | H04N 5/23219 |
| | | | | 348/207.1 |
| 2013/0262588 A1* | 10/2013 | Barak | ................ | G06K 9/00221 |
| | | | | 709/204 |
| 2014/0223474 A1* | 8/2014 | Wang | ................ | H04N 21/4316 |
| | | | | 725/34 |
| 2015/0213305 A1* | 7/2015 | Sundstrom | .............. | G06F 16/54 |
| | | | | 382/118 |
| 2015/0227609 A1 | 8/2015 | Shoemaker et al. | | |
| 2016/0350921 A1 | 12/2016 | Bataller et al. | | |
| 2016/0379047 A1 | 12/2016 | Natan et al. | | |

FOREIGN PATENT DOCUMENTS

| | | |
|---|---|---|
| CN | 104050449 | 9/2014 |
| CN | 104112209 | 10/2014 |
| CN | 105069073 | 11/2015 |
| CN | 105095873 | 11/2015 |
| CN | 106022317 | 10/2016 |
| CN | 106096009 | 11/2016 |
| CN | 106570465 | 4/2017 |
| CN | 106709468 | 5/2017 |
| CN | 107249037 | 10/2017 |
| CN | 107992822 | 5/2018 |
| WO | 2016177290 | 11/2016 |

OTHER PUBLICATIONS

WIPO, English translation of the ISR and WO for PCT/CN2018/118547, dated Feb. 27, 2019.
SIPO, First Office Action for CN Application No. 201711242740.6, dated Oct. 8, 2019.

\* cited by examiner

IMAGE PROCESSING OF FACE SETS UTILIZING AN IMAGE RECOGNITION METHOD

CROSS-REFERENCE TO RELATED APPLICATIONS

This application claims priority to Chinese Patent Application No. 201711242740.6, filed on Nov. 30, 2017, the entire disclosure of which is incorporated herein by reference.

FIELD

The present disclosure relates to computer technologies, and more particularly to an image processing method, a computer device and a computer readable storage medium.

BACKGROUND

With development of smartphones, the smartphone has more and more functions and more perfect performance. After a user captures images with the smartphone, the smartphone may upload the images captured by the user to a server, such that the server may classify the images according to image information. For example, the images can be classified according to time information, location information or face information included in the images. The associated images are displayed in a group, such that the user may browse the images according to different categories.

DISCLOSURE

Embodiments of the present disclosure provide an image processing method, a computer readable storage medium and a mobile terminal.

The image processing method includes: acquiring a first face set, the first face set being acquired by performing face recognition on a first image set according to a first recognition model; in response to detecting a connection to a network, receiving a second face set sent by a server, the second face set being acquired by the server through face recognition on images in a second image set according to a second recognition model, a recognition precision of the first recognition module being lower than a recognition precision of the second recognition model; performing image matching on the images in the first image set and the images in the second image set; processing the first face set according to the second face set and a result of the image matching; and classifying the first image set according to the processed first face set.

The computer device includes a memory and a processor. The memory has a computer readable instruction stored therein. When the instruction is executed by the processor, the processor is caused to perform following operations: acquiring a first face set, the first face set being acquired by performing face recognition on a first image set according to a first recognition model; in response to detecting a connection to a network, receiving a second face set sent by a server, the second face set being acquired by the server through face recognition on images in a second image set according to a second recognition model, a recognition precision of the first recognition module being lower than a recognition precision of the second recognition model; performing image matching on the images in the first image set and the images in the second image set; processing the first face set according to the second face set and a result of the image matching; and classifying the first image set according to the processed first face set.

The computer-readable storage medium has a computer program stored thereon. When the computer program is executed by a processor, the processor is caused to perform following operations: acquiring a first face set, the first face set being acquired by performing face recognition on a first image set according to a first recognition model; in response to detecting a connection to a network, receiving a second face set sent by a server, the second face set being acquired by the server through face recognition on images in a second image set according to a second recognition model, a recognition precision of the first recognition module being lower than a recognition precision of the second recognition model; performing image matching on the images in the first image set and the images in the second image set; processing the first face set according to the second face set and a result of the image matching; and classifying the first image set according to the processed first face set.

BRIEF DESCRIPTION OF THE DRAWINGS

To illustrate the solutions according to the embodiments of the present disclosure more clearly, accompanying drawings needed for describing the embodiments are briefly introduced below. Obviously, the accompanying drawings in the following descriptions are merely some embodiments of the present disclosure, and persons of ordinary skill in the art may obtain other drawings according to the accompanying drawings without making creative efforts.

EMBODIMENTS OF THE PRESENT DISCLOSURE

It is to be understood that, terms such as "first" and "second" used in the present disclosure may be used to describe various elements, but these elements are not limited by these terms. These terms are merely used to distinguish one element with another element. For example, without departing from the scope of the present disclosure, a first terminal may be referred to as a second terminal, and similarly, the second terminal may be referred to as the first terminal. Both the first terminal and the second terminal are terminals, but are not the same one.

Figure 1:
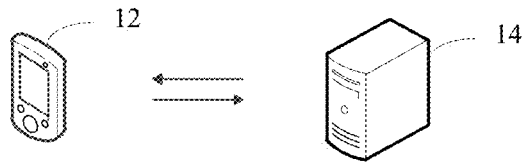
FIG. 1 is a schematic diagram of an application environment of an image processing method according to an embodiment of the present disclosure.

FIG. 1 is a schematic diagram of an application environment of an image processing method according to an embodiment of the present disclosure. As illustrated in FIG. 1, the application environment includes a client 12 and a server 14. The client 12 is configured to acquire a first image set and to perform face recognition on the first image set according to a first recognition model to acquire a first face set. The server 14 stores a second image set. The server 14 may perform face recognition on images in the second image set according to a second recognition model to acquire a second face set, and may send the acquired second face set to the client 12 when the client 12 is connected to a network. After the client 12 receives the second face set, the client 12 performs image matching on the images in the first image set and the images in the second image set, processes the first face set according to a result of the image matching, and classifies the first image set according to the processed first face set. The client 12 is an electronic device located at periphery of the computer network and mainly configured to input user information and output a processing result, such as a personal computer, a terminal, a personal digital assistant, a wearable electronic device or the like. The server 14 is a device configured to provide computing service in response to a service request, such as one or more computers.

Figure 2:
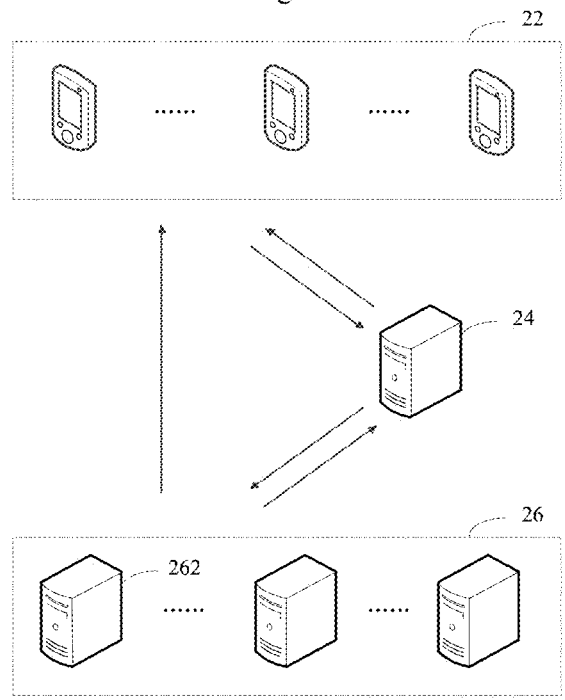
FIG. 2 is a schematic diagram of an application environment of an image processing method according to another embodiment of the present disclosure.

FIG. 2 is a schematic diagram of an application environment of an image processing method according to another embodiment of the present disclosure. As illustrated in FIG. 2, the application environment includes a client 22, a server 24 and a sub-server cluster 26. The client 22 is configured to acquire a first image set, to compress images in the first image set and to perform face recognition on the compressed images in the first image set to acquire a first face set. The server 24 stores a second image set, and sends the second image set to the sub-server cluster 26, such that the sub-server cluster 26 may perform face recognition to acquire a second face set. The second face set acquired by a sub-server 262 may be sent to the client 22 directly or may be sent to the server 24 such that the server 24 sends the second face set to the client 22. The sub-server cluster 26 includes one or more sub-servers 262, configured to realize distributed task processing. The client 22 is an electronic device located at periphery of the computer network and mainly configured to input user information and output a processing result, which may be for example a personal computer, a terminal, a personal digital assistant, a wearable electronic device or the like. Each of the server 24 and the sub-server 262 is a device configured to provide computing service in response to a service request, which may be for example one or more computers.

Figure 3:
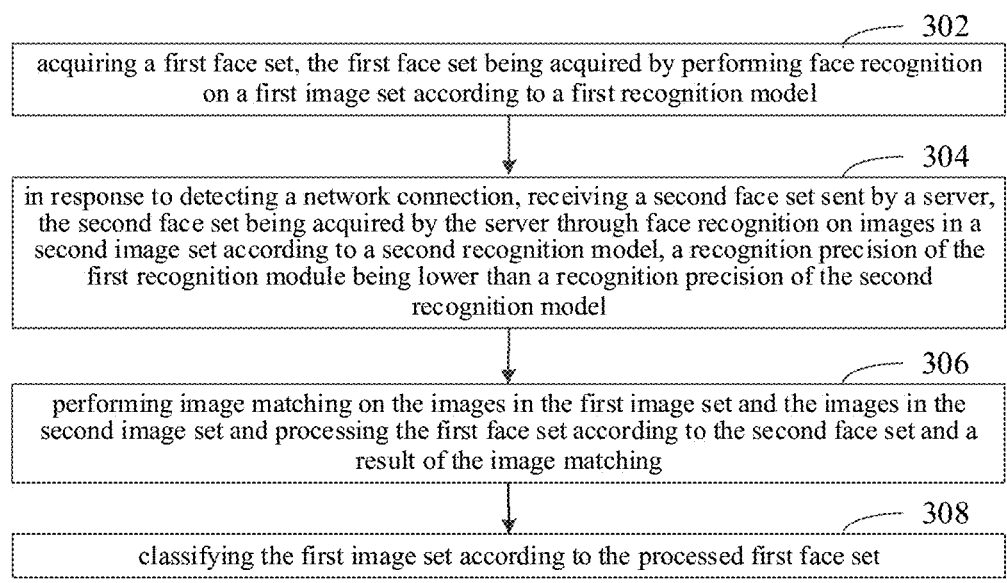
FIG. 3 is a flow chart of an image processing method according to an embodiment of the present disclosure.

FIG. 3 is a flow chart of an image processing method according to an embodiment of the present disclosure. As illustrated in FIG. 3, the image processing method includes acts at blocks 302-308.

At block 302, a first face set is acquired. The first face set is acquired by performing face recognition on a first image set according to a first recognition model.

In an embodiment provided in the present disclosure, the terminal generates images continuously during an operational process. For example, the images may be captured by a camera of the terminal, may be downloaded from a webpage, or may be stored automatically in a process of running an application. In an embodiment, when the terminal stores the generated images, several folders can be created in the memory, and the images generated during the operational process of the terminal are stored in these folders. The images generated by different applications can be stored in different folders. For example, the image captured by the camera and the image downloaded from the webpage can be stored in different folders respectively. When the images need to be acquired, a storage address of a folder is inputted to access the folder, and the images in the folder can be acquired.

The image set represents a set composed of one or more images. The first image set represents a set composed of images locally stored in the terminal. The second image set represents a set composed of images uploaded by the terminal and stored in the server. Since it is a common situation that an image is added into or deleted from the terminal from time to time and the terminal does not upload the image to the server in real time, the images stored in the terminal may be different from the images stored in the server. In other words, the first image set may be completely different from the second image set, the first image set may be partially same as the second image set or the first image set may be completely identical to the second image set.

The face recognition represents a process of recognizing a face included in an image. After the face recognition, the face included in the image can be extracted. The recognition model represents an algorithm model used for face recognition on the image. In an embodiment, the recognition model may extract face images and corresponding face characteristics from images and may classify the face images according to the face characteristics. The first recognition model is stored in the terminal while the second recognition model is stored in the server. A recognition precision of the first recognition model is lower than that of the second recognition model. Each image in the first image set is traversed and one or more faces are extracted from each image according to the first recognition model to generate the first face set. The face recognition can be further used for classifying the generated face set, such that the extracted face images with the same face can be classified into one group.

After the face recognition is performed on the first image set, each image may correspond to several face images, and a correspondence between image identifications, face identifications and classification identifications can be established. The image identification represents a unique identifier of an image. The face identification represents a unique identifier of a face image. The classification identification indicates classification information corresponding to the face image. The image identifications may have a one-to-one correspondence or a one-to-more correspondence with the face identifications. The face identifications have a one-to-one correspondence with the classification identifications. For example, the image identification may be "image.jpg". The image may include three face images which have face identifications "image_face01", "image_face02" and "image_face03" respectively. The classification identifications corresponding respectively to the three face images may be "group_01", "group_02" and "group_03", which means that the three face images are classified into different groups.

At block 304, in response to detecting a connection to a network, a second face set sent by the server is received. The second face set is acquired by the server through face recognition on images in a second image set according to a second recognition model. A recognition precision of the first recognition model is lower than that of the second recognition model.

In an embodiment, after the terminal uploads the images to the server, the server may generate the second image set according to the received images and establish a correspondence between the second image set and an identification of the terminal. The identification of the terminal represents a unique identification distinguishing different clients. The identification of the terminal may include, but be not limited in an internet protocol address, a media access control (MAC) address. The server typically has a large storage space and a strong computing capability. After receiving the second image set, the server may trigger the face recognition on the second image set on time to generate the second face set.

The network may be in a form of wireless fidelity (Wi-fi), 2G data network, 3G data network, 4G data network or the like. When the terminal detects a connection to the network, the terminal may automatically initiate a face image acquiring request to the server. The face image acquiring request carries the identification of the terminal. After the server receives the face image acquiring request, the server may return the second face set corresponding to the identification of the terminal to the terminal. Taking the Android system as an example, the class NetworkInfo includes detailed descriptions of Wi-fi network mode and data network mode. A connection state of a current network can be acquired through the method getState( ).

Since the face set sent by the server may occupy a large space, data traffic consumed during transmission is large. Therefore, before the second face set is received, it is determined a network type of the network connected to the terminal. When the connected network is a preset network type, the second face set sent by the server is received. For example, when it is determined that the terminal is connected to Wi-fi network, the second face set sent by the server is received. In an embodiment, the act at block 304 includes: in response to detecting the connection to the network, acquiring a network type of the network; when the network type is a preset network type, receiving the second face set sent by the server. Moreover, when the connected network is the data network, it is determined remaining data traffic of the data network. When the remaining data traffic is greater than a traffic threshold, the second face set sent by the server is received. Each face image in the second face set received by the terminal corresponds to an image identification, a face identification and a classification identification.

At block 306, an image matching is performed on the images in the first image set and the images in the second image set, and the first face set is processed according to the second face set and a result of the image matching.

In an embodiment, performing the image matching on the images in the first image set and the images in the second image set represents performing the image matching on image identifications corresponding to the images in the first image set and image identifications corresponding to the images in the second image set. The result of the image matching includes any one of: 1, an image existing both in the first image set and the second image set; 2, an image existing in the first image set but not existing in the second image set; 3, an image existing in the second image set but not existing in the first image set.

The second face set is acquired by performing the face recognition on original images. The face image in the second face set may have a high precision. For different results of the image matching, the first face set may be processed differently according to the second face set. For example, when an image exists both in the first image set and the second image set, a face image corresponding to the image in the first face set is replaced with a face image corresponding to the image in the second face set. When an image exists in the first image set but does not exist in the second image set, a face image corresponding to the image in the first face set remains unchanged. When an image exists in the second image set but does not exist in the first image set, a face image corresponding to the image in the second face set is added into the first face set.

At block 308, the first image set is classified according to the processed first face set.

In an embodiment, each face image in the first face set corresponds to an image identification, a face identification and a classification identification. After the first face set is processed, the first image set is classified according to the face images in the first face set. The images corresponding to the same face can be classified into one category. Since an image may include several faces, the image may be classified into several categories. In an embodiment, in response to detecting no connection to the network at block 304, the first image set is classified directly according to the first face set.

With the image processing method according to embodiments of the present disclosure, the face recognition is performed on the first image set according to the first recognition model to acquire the first face set. The face recognition is performed on the second image set by the server to acquire the second face set. The first face set is processed according to the second face set, and the first image set is classified according to the first face set. Since the second face set is acquired by performing the face recognition on uncompressed original images, the acquired face images in the second face set have high accuracy. Since the first face set is processed according to the second face set, an accuracy of the first face set is improved, such that the classification processing performed on the first image set according to the first face set has improved accuracy, thus improving accuracy of image processing.

Figure 4:
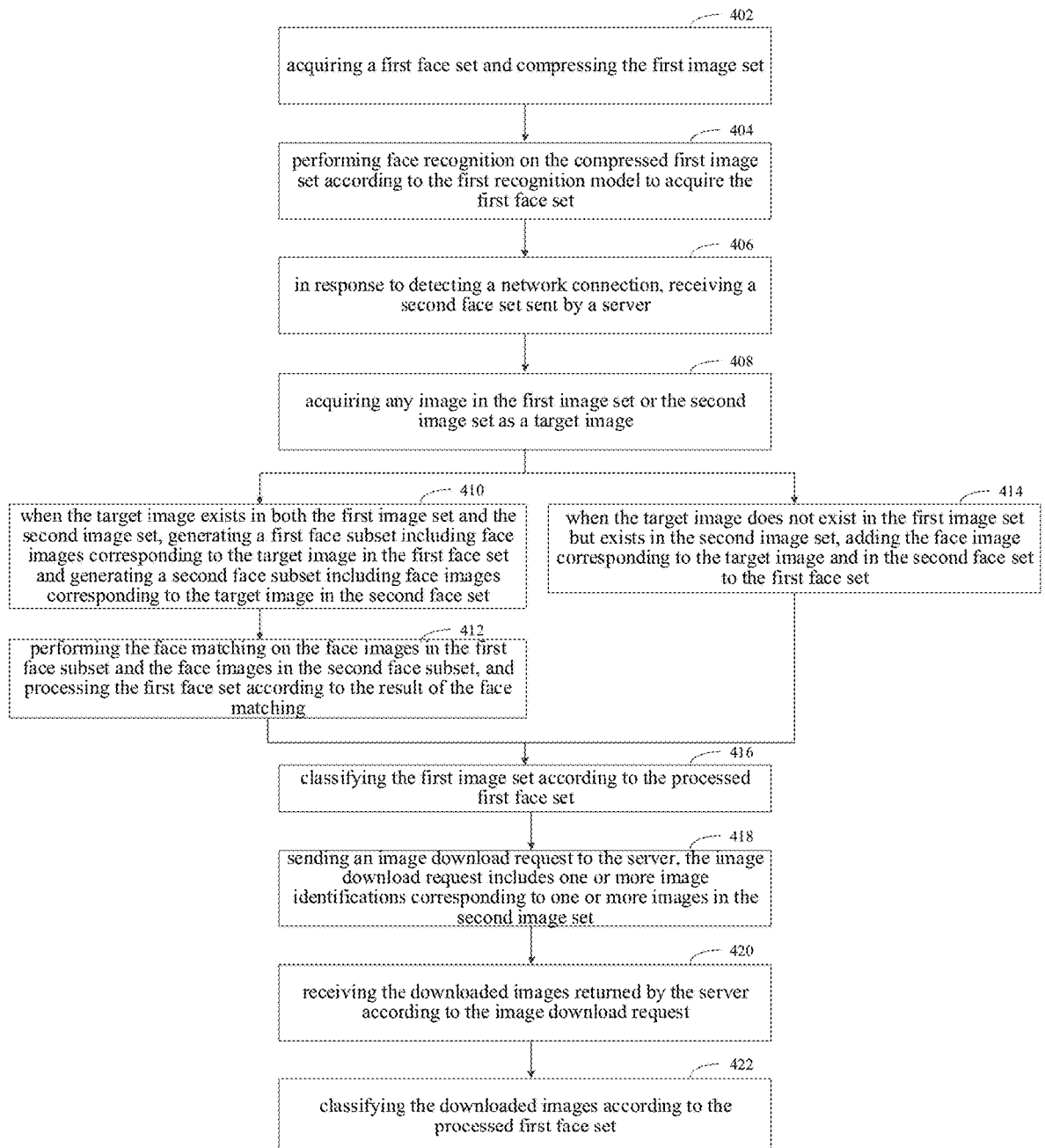
FIG. 4 is a flow chart of an image processing method according to another embodiment of the present disclosure.

FIG. 4 is a flow chart of an image processing method according to another embodiment of the present disclosure. As illustrated in FIG. 4, the image processing method includes acts at blocks 402-422.

At block 402, a first image set is acquired, and images in the first image set are compressed.

After the terminal stores the images, the terminal may synchronize the images to the server for storing the images in the server, such that an image can be acquired from the server even when the image is deleted from the terminal. In order to reduce consumption of the terminal, the terminal needs not to upload the images in real time. Instead, the terminal synchronizes the images to the server for storage when a certain condition is met. The terminal synchronizes the images to the server for storage when at least one of following conditions is met: the number of images newly added to the terminal being greater than a preset number; a current time being a preset time; a time period from the last synchronization to the current time exceeding a preset time period; the terminal being in a charging state. For example, when the number of images newly added to the terminal is greater than 50, the current time is in a range of 2 am to 5 am, and the terminal is in the charging state, the images in the terminal are synchronized to the server.

The images are stored in a storage space of the terminal. The storage space of the terminal is divided into an internal storage and an external storage. The internal storage represents a memory built in the terminal, which is a part of a hardware structure of the terminal. The external storage represents a storage device external to the terminal, which may perform data transmission with the terminal via a specific interface. For example, the external storage may be a SD card, a U disk or the like. The terminal may acquire images from a preset storage address directly or may traverse all folders in the terminal to acquire the images, and generate the first image set according to the acquired images.

Since the storage space of the terminal is limited, the images are compressed when the images are processed to reduce computing amount. The compressing processing may reduce a size of an image, such that the storage space occupied by the image is reduced. When the compressed images are processed, the computing amount is reduced accordingly. The compressing processing may include scaling down the image in scale or scaling down the image to a fixed size. For example, when the image with a size of approximately 200*300 is scaled down in a scale of 1:0.5, the compressed image has the size of approximately 100*150. When the image with a size of approximately 300*600 is scaled down in a scale of 1:0.5, the compressed image has the size of approximately 150*300. When these images are scaled down to the fixed size of approximately 100*200, the compressed images have the size of approximately 100*200.

At block 404, the face recognition is performed on the compressed images in the first image set according to a first recognition model to acquire the first face set.

The recognition model represents a model used for the face recognition on images. In an embodiment, the recognition model may extract face images and corresponding face characteristics from images and may classify the face images according to the face characteristics. The first recognition model is stored in the terminal while a second recognition model is stored in the server. Since the terminal has limited processing capability while the server has powerful processing capability, the first recognition model stored in the terminal is a miniature recognition model and the second recognition model stored in the server is a wholequantity recognition model. An algorithm of the second recognition model is more complicated than that of the first recognition model, such that the second recognition model has more accurate recognition result than the first recognition model. In other words, a recognition precision of the first recognition model is lower than that of the second recognition model.

At block 406, in response to detecting a connection to a network, a second face set sent by the server is received.

The second face set is acquired by the server through the face recognition on images in a second image set according to the second recognition model. The server may perform the face recognition on the images in the second image set on time to acquire the second face set. When the terminal detects the connection to a network, the terminal initiates a face acquiring request to the server. After the server receives the face acquiring request, the server returns the second face set to the terminal according to the face acquiring request. The second face set is acquired by the server through the face recognition on the images in the second image set according to the second recognition model.

At block 408, an image in the first image set or the second image set is acquired as a target image.

At block 410, when the target image exists both in the first image set and the second image set, a first face subset including face images corresponding to the target image in the first face set is generated, and a second face subset including face images corresponding to the target image in the second face set is generated.

When the target image exists both in the first image set and the second image set, it indicates that both the first face set and the second face set include the face images corresponding to the target image. A face matching is performed on the face images corresponding to the target image in the first face set and the face images corresponding to the target image in the second face set, and the first face set is processed according to a result of the face matching. The face images corresponding to the target image in the first face set may constitute the first face subset. The face images corresponding to the target image in the second face set may constitute the second face subset. The face matching is performed on the face images in the first face subset and the face images in the second face subset, and the first face set is processed according to the result of the face matching.

At block 412, the face matching is performed on the face images in the first face subset and the face images in the second face subset, and the first face set is processed according to the result of the face matching.

Since the face images in the first face set are acquired by performing the face recognition on compressed images and the face images in the second face set are acquired by performing the face recognition on uncompressed original images, when the face matching needs to be performed on the face images in the first face subset and the second face subset, the face images in the second face subset are compressed and the face matching is performed. The face images in the second face subset are compressed and the face matching is performed on the face images in the first face subset and the compressed face images in the second face subset.

The face matching is performed on the face images in the first face subset and the face images in the second face subset to acquire the result of the face matching, which may be any one of: 1, a face image existing both in the first image subset and the second image subset; 2, a face image existing in the first image subset but not existing in the second image subset; 3, a face image existing in the second image subset but not existing in the first image subset. For different results of the face matching, the face images in the first face set are processed differently.

Figure 5:
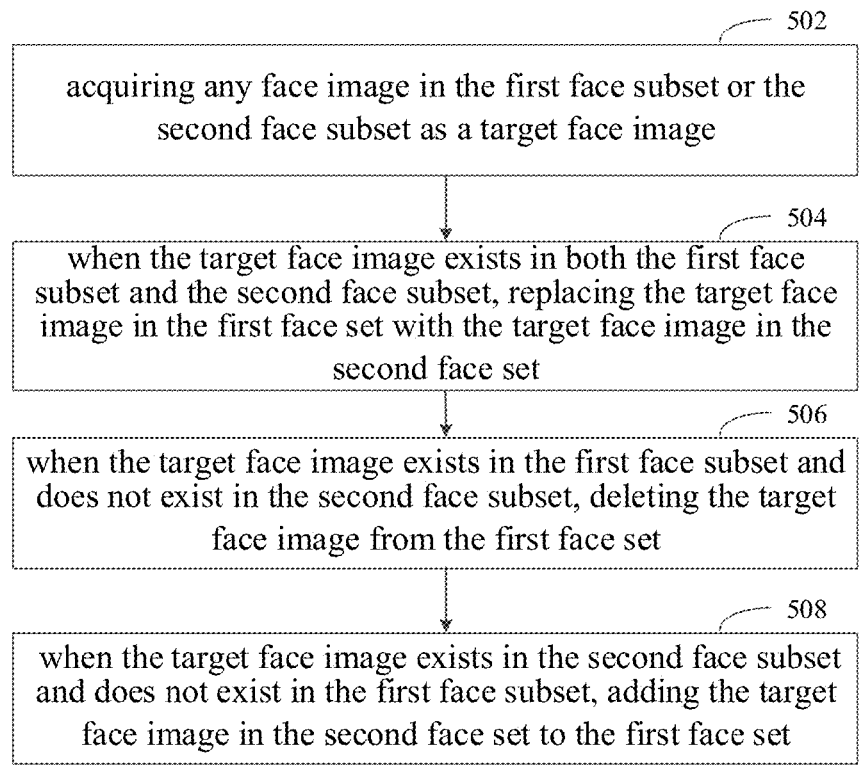
FIG. 5 is a flow chart of an image processing method according to a still embodiment of the present disclosure.

As illustrated in FIG. 5, in an embodiment, the act at block 412 may include: acquiring any face image in the first face subset or the second face subset as a target face image at block 502; when the target face image exists in both the first face subset and the second face subset, replacing the target face image in the first face set with the target face image in the second face set at block 504; when the target face image exists in the first face subset and does not exist in the second face subset, deleting the target face image from the first face set at block 506; when the target face image exists in the second face subset and does not exist in the first face subset, adding the target face image in the second face set to the first face set at block 508.

In an embodiment, it is assumed that an image "A.jpg" exists both in the terminal and the server, i.e., existing both in the first image set and the second image set. The recognition result performed by the terminal on the image "A.jpg" indicates that "Face01" and "Face 02" are included. The recognition result performed by the server on the image "A.jpg" indicates that "FFace02" and "FFace 03" are included. In other words, the first face subset corresponding to the image "A.jpg" in the first face set includes "Face01" and "Face02". The second face subset corresponding to the image "A.jpg" in the second face set includes "FFace02" and "FFace03". "Face02" recognized by the terminal and "FFace02" recognized by the server may be the same face. Since "Face01" exists only in the first face subset but does not exist in the second face subset, "Face01" is deleted from the first face set. Since "Face02" exists both in the first face subset and the second face subset, "Face02" in the first face set is replaced with "FFace02" in the second face set. Since "FFace03" does not exist in the first face subset but exists in the second face subset, "FFace03" in the second face set is added to the first face set. The face images corresponding to the image "A.jpg" and in processed first face set include "FFace02" and "FFace03".

At block 414, when the target image does not exist in the first image set but exists in the second image set, the face image corresponding to the target image in the second face set is added to the first face set.

When the target image does not exist in the first image set but exists in the second image set, it indicates that the first face set does not include the face image corresponding to the target image and the second face set includes the face image corresponding to the target image. The face image corresponding to the target image and in the second face set is added to the first face set. When the target image exists in the first image set but does not exist in the second image set, the face image corresponding to the target image in the first face set remains unchanged.

For example, the terminal deletes an image "B.jpg" after uploading the image "B.jpg" to the server, such that the image "B.jpg" does not exist in the terminal but exists in the server. When the face recognition is performed, the first image set does not include the image "B.jpg" but the second image set includes the image "B.jpg". The first face set does not include a face image corresponding to the image "B.jpg" and the second face set includes the face images "FFace001" and "FFace002" corresponding to the image "B.jpg". The face images "FFace001" and "FFace002" are added to the first face set directly.

At block 416, the first image set is classified according to the processed first face set.

Figure 6:
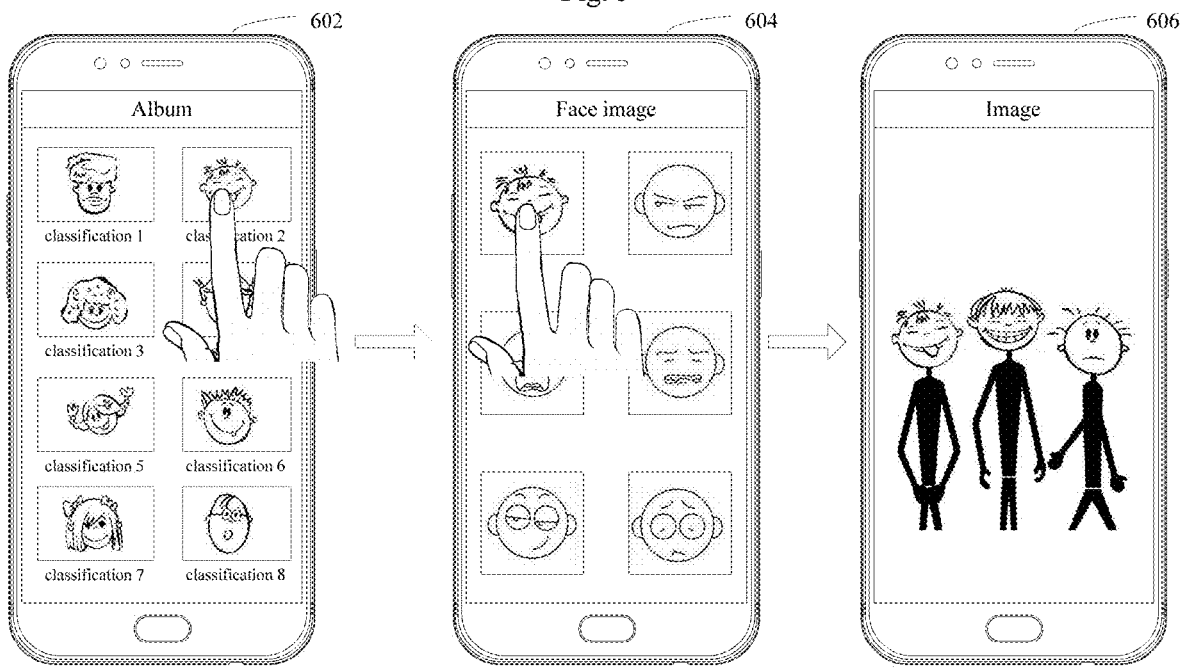
FIG. 6 is a schematic diagram of a terminal illustrating classified images according to an embodiment of the present disclosure.

FIG. 6 is a schematic diagram of a terminal illustrating classified images according to an embodiment of the present disclosure. As illustrated in FIG. 6, the terminal classifies the first image set according to the first face set and displays a classification result in the terminal interface. A classification displaying interface 602 displays eight classifications, including "classification 1", "classification 2", "classification 3", "classification 4", "classification 5", "classification 6", "classification 7" and "classification 8". Each classification includes server face images with a similarity. When one classification is clicked, the face images in this classification can be viewed in a face image displaying interface 604. When one face image is clicked, an image corresponding to the face image can be viewed in the image displaying interface 606.

At block 418, an image download request is sent to the server. The image download request includes one or more image identifications corresponding to one or more images in the second image set.

After the server receives the images sent by the terminal, the server may store the received images. In this way, after an image is deleted from the terminal, the image can be acquired from the server. After the server receives the images uploaded by the terminal, the server may generate the second image set according to the received images and generate a webpage linkage according to the second image set, and return the webpage linkage to the terminal. The terminal may acquire the stored second image set by accessing the webpage linkage, and download the images in the second image subset. The webpage linkage corresponds to a webpage document. When the webpage linkage is clicked, the terminal acquires and reads the webpage document. The webpage document includes a storage address and an image identification for each image. After acquiring the webpage document, the terminal parses the webpage document and displays content in the webpage document. The user may view the images through the displayed content.

The image download request represents a request sent by the terminal to acquire one or more images in the second image set. The image download request includes one or more image identifications corresponding to one or more images in the second image set. A communication connection is established between the terminal and the server. After the communication connection is established, the server may return a message indicating that the connection is established successfully to the terminal. For example, the communication connection may be established between the terminal and the server through a pair of ports (socket). After the connection is established, the image is sent via the connected port. After the connection is established, the terminal sends the image download request to the server.

Figure 7:
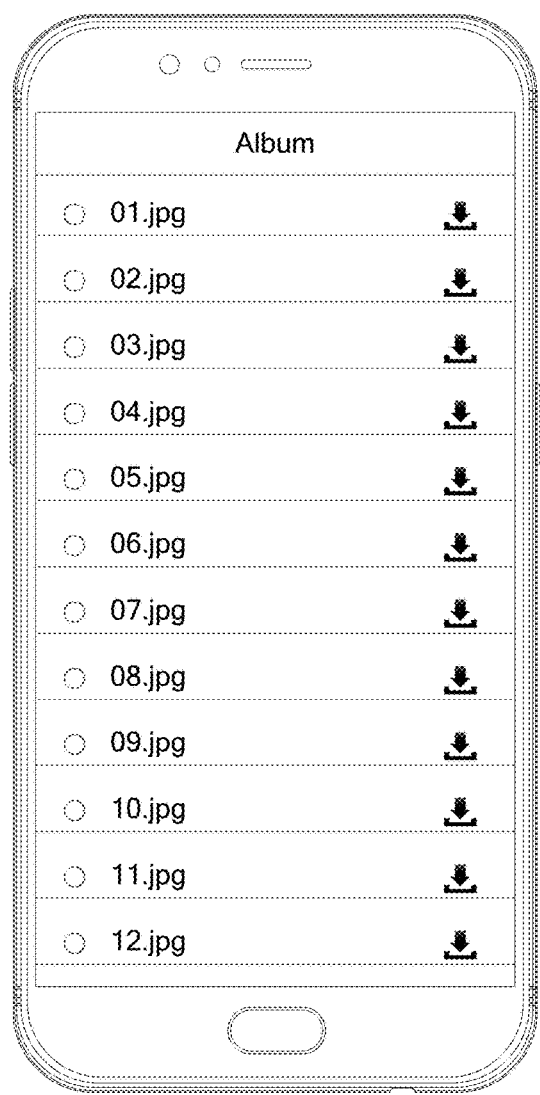
FIG. 7 is a schematic diagram of a terminal interface illustrating an image download page according to an embodiment of the present disclosure.

FIG. 7 is a schematic diagram of an interface of a terminal interface illustrating an image download page according to an embodiment of the present disclosure. As illustrated in FIG. 7, the terminal interface displays the images stored in the server. The images uploaded to the server can be viewed and downloaded through the terminal interface of the terminal.

At block 420, the one or more images returned by the server according to the image download request are received.

At block 422, the one or more images are classified according to the processed first face set.

The downloaded images returned by the server according to the image download request are received. When a downloaded image exists in the first image set of the terminal, the corresponding image in the first image set is replaced with the downloaded image. When the downloaded image does not exist in the first image set of the terminal, the downloaded image is added to the first image set directly. The terminal processes the first face set according to the second face set. The processed first face set further includes face recognition results of all images in the second image set. When the mobile terminal receives the downloaded images returned by the server, the downloaded images can be classified directly according to the first face set without any face recognition on the downloaded images.

With the image processing method according to the embodiment of the present disclosure, the first image set is compressed and the face recognition is performed on the compressed first image set to acquire the first face set. The face recognition is performed on the second image set by the server to acquire the second face set. The image matching is performed on the images in the first image set and the images in the second image set. The first face set is processed according to the result of the image matching and the first image set is classified according to the processed first face set. Since the second face set is acquired by performing the face recognition on uncompressed original images, the acquired face images have high accuracy. Since the first face set is processed according to the second face set, an accuracy of the first face set is improved, such that the classification processing performed on the first image set according to the first face set has improved accuracy, thus improving accuracy of image processing.

Figure 8:
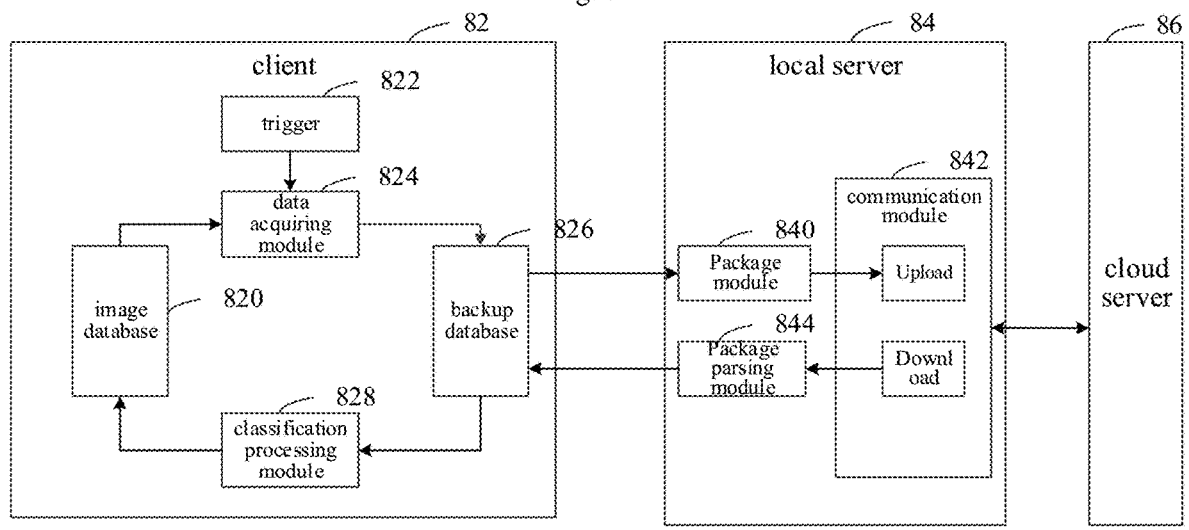
FIG. 8 is a block diagram of an image processing system according to an embodiment of the present disclosure.

FIG. 8 is a block diagram of an image processing system according to an embodiment of the present disclosure. As illustrated in FIG. 8, the image processing system includes a client 82, a local server 84 and a cloud server 86. The workflow of the image processing system includes two stages: image synchronization stage and image classification stage. The image synchronization stage includes: a trigger 822 initiating a synchronization request, a data acquiring module 824 acquiring an image from an image database 820, storing the acquired image in a backup database 826, the backup database 826 sending images to the local server 84. The local server 84 packages the images via a package module 840 and uploads the packaged images to the cloud server 86 via a communication module 842. The cloud server 86 generates the second image set and stores the second image set after receiving the images. The image classification stage includes: the trigger 822 initiating a classification request, the data acquiring module 824 acquiring a first image set from the image database 820, and storing the first image set in the backup database 826. A classification processing module 828 may compress the first image set, perform the face recognition on the compressed first image set and store the acquired first face set into the backup database 826. The cloud server 86 performs the face recognition on the second image set to acquire a second face set and sends the second face set to the local server 84 when the client 82 is connected to a network. The local server 84 receives the second face set via the communication module 842, parses the second face set via the package parsing module 844, and sends the parsed second face set to the client 82, such that the second face set can be stored in the backup database 826. The classification processing module 828 may process the first face set according to the second face set and classify the first image set according to the processed first face set.

Figure 9:
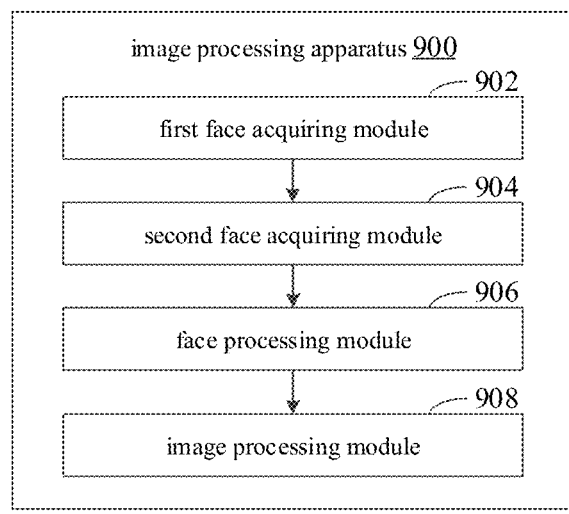
FIG. 9 is a block diagram of an image processing apparatus according to an embodiment of the present disclosure.

FIG. 9 is a block diagram of an image processing apparatus according to an embodiment of the present disclosure. As illustrated in FIG. 9, the image processing apparatus 900 includes a first face acquiring module 902, a second face acquiring module 904, a face processing module 906 and an image processing module 908.

The first face acquiring module 902 is configured to acquire a first face set. The first face set is acquired by performing face recognition on a first image set according to a first recognition model.

The second face acquiring module 904 is configured to, in response to detecting a connection to a network, receive a second face set sent by a server. The second face set is acquired by the server through face recognition on images in a second image set according to a second recognition model. A recognition precision of the first recognition model is lower than that of the second recognition precision.

The face processing module 906 is configured to performing image matching on the images in the first image set and the images in the second image set, to process the first face set according to the second face set and a result of the image matching.

The image processing module 908 is configured to classify the first image set according to the processed first face set.

With the image processing apparatus according to embodiments of the present disclosure, the face recognition is performed on the first image set according to the first recognition model to acquire the first face set. The face recognition is performed on the second image set by the server to acquire the second face set. The first face set is processed according to the second face set, and the first image set is classified according to the first face set. Since the second face set is acquired by performing the face recognition on uncompressed original images, the acquired face images are more accurate. Since the first face set is processed according to the second face set, the first face set is more accurate, such that the classification processing performed on the first image set according to the first face set is more accurate, thus improving accuracy of image processing.

Figure 10:
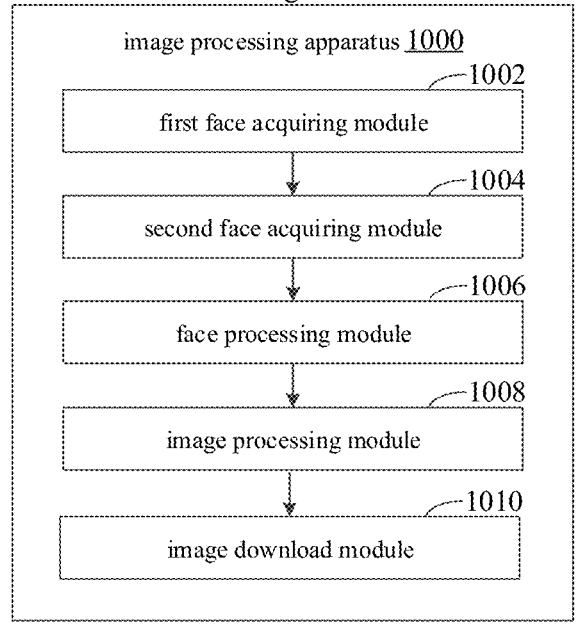
FIG. 10 is a block diagram of an image processing apparatus according to another embodiment of the present disclosure.

FIG. 10 is a block diagram of an image processing apparatus according to another embodiment of the present disclosure. As illustrated in FIG. 10, the image processing apparatus 1000 includes a first face acquiring module 1002, a second face acquiring module 1004, a face processing module 1006, an image processing module 1008 and an image download module 1010.

The first face acquiring module 1002 is configured to acquire a first face set. The first face set is acquired by performing face recognition on a first image set according to a first recognition model.

The second face acquiring module 1004 is configured to, in response to detecting a connection to a network, receive a second face set sent by a server. The second face set is acquired by the server through face recognition on images in a second image set according to a second recognition model. A recognition precision of the first recognition model is lower than that of the second recognition precision.

The face processing module 1006 is configured to perform image matching on the images in the first image set and the images in the second image set, to process the first face set according to the second face set and a result of the image matching.

The image processing module 1008 is configured to classify the first image set according to the processed first face set.

The image download module 1010 is configured to send an image download request to the server, the image download request including one or more image identifications corresponding to one or more images in the second image set, to receive the one or more images returned by the server according to the image download request, and to classify the one or more images according to the processed first face set.

With the image processing apparatus according to embodiments of the present disclosure, the face recognition is performed on the first image set according to the first recognition model to acquire the first face set. The face recognition is performed on the second image set by the server to acquire the second face set. The first face set is processed according to the second face set, and the first image set is classified according to the first face set. Since the second face set is acquired by performing the face recognition on uncompressed original images, the acquired face images are more accurate. Since the first face set is processed according to the second face set, the first face set is more accurate, such that the classification processing performed on the first image set according to the first face set is more accurate, thus improving accuracy of image processing.

In an embodiment, the first face acquiring module 1002 is further configured to acquire the first image set, to compress the first image set, to perform face recognition on the compressed first image set according to the first recognition model to acquire the first face set.

In an embodiment, the face processing module 1006 is further configured to: acquire any image in the first image set or the second image set as a target image; when the target image exists in both the first image set and the second image set, generate a first face subset including face images corresponding to the target image in the first face set and generate a second face subset including face images corresponding to the target image in the second face set; perform the face matching on the face images in the first face subset and the face images in the second face subset; and process the first face set according to a result of the face matching.

In an embodiment, the face processing module 1006 is further configured to: compress the face images in the second face subset; and perform the face matching on the face images in the first face subset and the compressed face images in the second face subset.

In an embodiment, the face processing module 1006 is further configured to: acquire any face image in the first face subset or the second face subset as a target face image; when the target face image exists in both the first face subset and the second face subset, replace the target face image in the first face set with the target face image in the second face set; when the target face image exists in the first face subset and does not exist in the second face subset, delete the target face image from the first face set; when the target face image exists in the second face subset and does not exist in the first face subset, add the target face image in the second face set to the first face set.

In an embodiment, the face processing module 1006 is further configured to: acquire any image in the first image set or the second image set as a target image; when the target image exists in the second image set and does not exist in the first image set, add a face image corresponding to the target image in the second face set to the first face set.

In an embodiment, the image processing module 1008 is further configured to: in response to detecting no connection to a network, classify the first image set according to the first face set.

The division of the above-mentioned image processing apparatus into modules is schematic. In other embodiments, the image processing apparatus can be divided into different modules according to requirements to implement all or a part of functions of the image processing apparatus.

Figure 11:
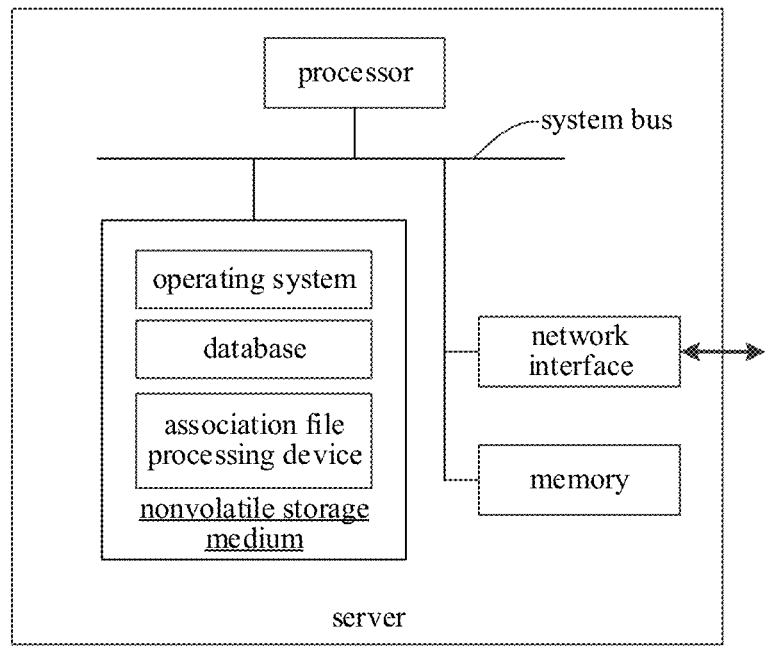
FIG. 11 is a block diagram of an internal structure of a server according to an embodiment of the present disclosure.

FIG. 11 is a block diagram of an internal structure of a server according to an embodiment of the present disclosure. As illustrated in FIG. 11, the server includes a processor, a nonvolatile storage medium, a memory and a network interface coupled via a system bus. The processor is configured to provide the computing and control capability, to support running of the entire computer device. The memory is configured to store data, program or the like. The memory has at least one computer program stored therein. The computer program can be executed by the processor, to perform a wireless network communication method applicable to the computer device provided in the embodiment of the present disclosure. The memory may include the nonvolatile storage medium such as a magnetic disk, an optical disk, a read-only memory (ROM), or a random-access-memory (RAM). For example, in an embodiment, the memory includes the nonvolatile storage medium and the internal memory. The nonvolatile storage medium has an operating system and a computer program stored therein. The computer program may be executed by the processor, to perform the image processing method according to the embodiment of the present disclosure. The internal memory provides the running environment of high speed buffer for the operating system and computer program in the nonvolatile storage medium. The network interface may be an Ethernet card or a wireless network card, configured to communicate with an external computer device. The server may be implemented by a separate server or a server cluster including several servers. It can be understood by those skilled in the art that, the structure illustrated in FIG. 11 is merely exemplary, but does not constitute a limitation on the server to which the present disclosure is applied. The server may include more or less components than those illustrated, or some components may be combined, or the components may be arranged differently.

Embodiments of the present disclosure also provide a computer-readable storage medium, such as one or more non-transitory computer-readable storage medium including computer executable instructions. When the computer executable instructions are executed by one or more processors, the one or more processors can be caused to perform: acquiring a first face set, the first face set being acquired by performing face recognition on a first image set according to a first recognition model; in response to detecting a network connection, receiving a second face set sent by a server, the second face set being acquired by the server through face recognition on images in a second image set according to a second recognition model, a recognition precision of the first recognition module being lower than a recognition precision of the second recognition model; performing image matching on the images in the first image set and the images in the second image set; processing the first face set according to the second face set and a result of the image matching; and classifying the first image set according to the processed first face set.

In an embodiment, the processor is further configured to perform operations: acquiring the first image set; compressing the first image set; and performing face recognition on the compressed first image set according to the first recognition model to acquire the first face set.

In an embodiment, the processor is configured to perform image matching on the images in the first image set and the images in the second image set and process the first face set according to the second face set and a result of the image matching by operations: acquiring any image in the first image set or the second image set as a target image; when the target image exists in both the first image set and the second image set, generating a first face subset including face images corresponding to the target image in the first face set and generating a second face subset including face images corresponding to the target image in the second face set; performing face matching on the face images in the first face subset and the face images in the second face subset; and processing the first face set according to a result of the face matching.

In an embodiment, the processor is configured to perform the face matching on the face images in the first face subset and the face images in the second face subset by operations: compressing the face images in the second face subset; and performing the face matching on the face images in the first face subset and compressed face images in the second face subset.

In an embodiment, the processor is configured to process the first face set according to the result of the face matching by operations: acquiring any face image in the first face subset or the second face subset as a target face image; when the target face image exists in both the first face subset and the second face subset, replacing the target face image in the first face set with the target face image in the second face set; when the target face image exists in the first face subset and does not exist in the second face subset, deleting the target face image from the first face set; when the target face image exists in the second face subset and does not exist in the first face subset, adding the target face image in the second face set to the first face set.

In an embodiment, the processor is configured to perform the image matching on the images in the first image set and the images in the second image set and process the first face set according to the second face set and the result of the image matching by operations: acquiring any image in the first image set or the second image set as a target image; and when the target image exists in the second image set and does not exist in the first image set, adding a face image corresponding to the target image in the second face set to the first face set.

In an embodiment, the processor is configured to perform operations: in response to detecting no connection to a network, classifying the first image set according to the first face set.

In an embodiment, the processor is configured to perform operations: sending an image download request to the server, the image download request including one or more image identifications corresponding to one or more images in the second image set; receiving the one or more images returned by the server according to the image download request; and classifying the one or more images according to the processed first face set.

The computer program product including the instructions, when running in a computer, the computer is caused to perform the image processing method.

Figure 12:
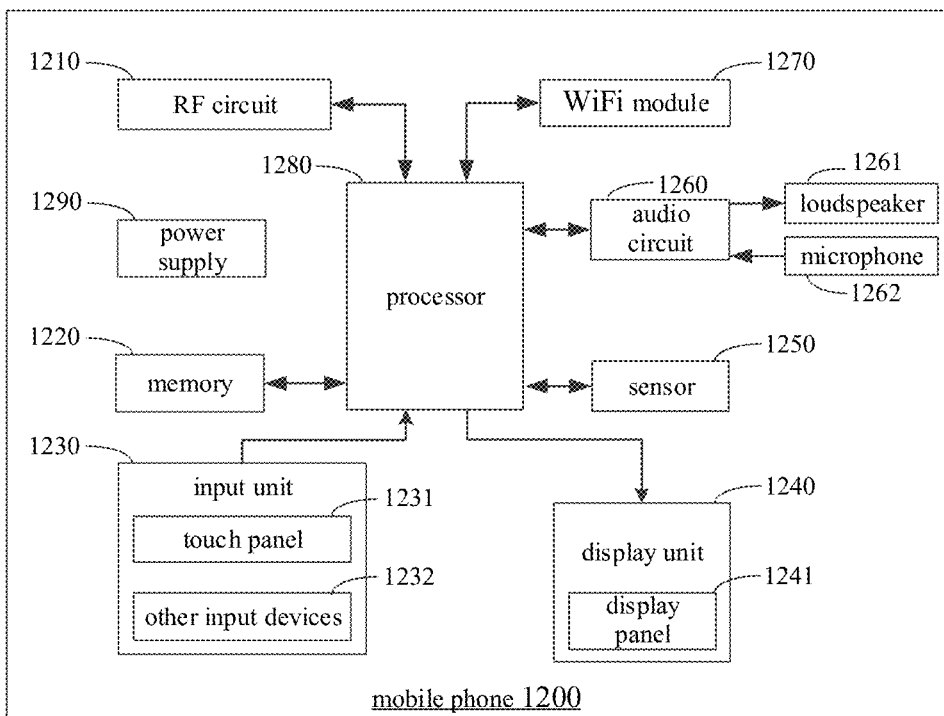
FIG. 12 is a block diagram of a partial structure of a mobile phone related to a computer device provided in an embodiment of the present disclosure.

Embodiments of the present disclosure also provide a computer device. As illustrated in FIG. 12, for the convenience of description, only parts related to the embodiments of the present disclosure are illustrated. Regarding details that are not disclosed, reference may be made to the method embodiments of the present disclosure. The computer device may be any terminal device including a mobile phone, a tablet computer, a PDA (personal digital assistant), a point of sales (POS), a car computer, a wearable device and the like. The computer device being a mobile phone is taken as an example.

FIG. 12 is a block diagram illustrating a partial structure of a mobile phone related to a computer device provided by an embodiment of the present disclosure. Referring to FIG. 12, the mobile phone includes: a radio frequency (RF) circuit 1210, a memory 1220, an input unit 1230, a display unit 1240, a sensor 1250, an audio circuit 1260, a wireless fidelity (Wi-Fi) module 1270, a processor 1280, a power supply 1290 and other components. It will be understood by those skilled in the art that the structure of the mobile phone illustrated in FIG. 12 does not constitute a limitation to the mobile phone, and may include more or less components than those illustrated, or some components may be combined, or the components may be arranged differently.

The RF circuit 1210 may be configured to receive and transmit signals during a process of transmitting and receiving a message or making a call. The RF circuit 1210 may be configured to receive downlink data from a base station and to transmit the downlink data to the processor 1280. Alternatively, the RF circuit 1210 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 1210 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 1220 may be configured to store software programs or modules. The processor 1280 is configured to execute various functional applications and data processes of the mobile phone by running the software programs and modules stored in the memory 1220. The memory 1220 may mainly include a program storage region and a data storage region. The program storage region may store an operating system, at least one function required application (such as an application having a sound playing function, an application having an image playing function) and the like. The data storage region may store data produced by using the mobile phone (such as audio data, an address book) and the like. In addition, the memory 1220 may include a high speed random access memory and may include a non-volatility memory, such as at least one disk memory, a flash memory, or other volatility solid state memory.

The input unit 1230 may be configured to receive figure or character information inputted and generate a key signal input related to a user setup or function control of the mobile phone 1200. In detail, the input unit 1230 may include a touch panel 1231 and other input devices 1232. The touch panel 1231 (also called as touch screen) may be configured to gather touch operations near or on the touch panel 1231 (such as an operation on the touch panel 1231 or near the touch panel 1231 of the user with a finger, a stylus or other suitable objects or attachments), and drive corresponding coupled device according to a preset program. In an embodiment, the touch panel 1231 may include a touch detection device and a touch controller. The touch detection device detects an orientation of the user's touch, detects a signal caused by the touch operation and sends the signal to the touch controller. The touch controller receives the touch information from the touch detection device, converts the touch information to touch point coordinates, and sends the touch point coordinates to the processor 1280. Furthermore, the touch controller may receive and execute a command sent from the processor 1280. The touch panel 1231 may be implemented as a resistive type, a capacitive type, an infrared type and a surface acoustic wave type touch panel. In addition to the touch panel 1231, the input unit 1230 may further include other input devices 1232. In detail, the other input devices 1232 may include but are not limited to one or more of a physical keyboard, a functional key (such as a volume control key, a switch key and the like).

The display unit 1240 may be configured to display information inputted by the user or information provided to the user or various menus of the mobile phone. The display unit 1240 may include a display panel 1241. In an embodiment, the display panel 1241 may be configured as a liquid crystal display (LCD), an organic light-emitting diode (OLED) and the like. In an embodiment, the touch panel 1031 may cover the display panel 1241. When the touch panel 1231 detects the touch operation on the touch panel 1231 or near the touch panel 1231, the touch operation is transmitted to the processor 1280 to determine a type of the touch event. Thereafter, the processor 1280 provides a corresponding visual output on the display panel 1241 according to the type of the touch event. Although the touch panel 1231 and the display panel 1241 are two separate components in FIG. 12 to realize an input and output function of the mobile phone, in certain embodiments, the touch panel 1231 and the display panel 1241 may be integrated to realize the input and output function of the mobile phone.

The mobile phone 1200 may further include at least one sensor 1250, such as an optical sensor, a motion sensor and other sensors. In detail, the optical sensor may include a surrounding light sensor and a proximity sensor. The surrounding light sensor may adjust a brightness of the display panel 1241 according to surrounding lights. The proximity sensor may close the display panel 1241 and/or backlight when the mobile phone moves near ears of the user. The motion sensor may include an acceleration sensor. By the acceleration sensor the acceleration values in various directions can be measured, and a magnitude and a direction of gravity can be measured when the mobile phone is static. The acceleration sensor can be used in identifying a posture of the mobile phone (such as landscape/portrait screen switching), vibration recognition related functions (such as a pedometer, a knocking) and the like. Furthermore, the mobile phone may be configured with a gyroscope, a barometer, a hygrometer, a thermometer, an infrared sensor and other sensors.

The audio circuit 1260, a loudspeaker 1261 and a microphone 1262 may provide an audio interface between the user and the mobile phone. The audio circuit 1260 may receive audio data, convert the audio data to an electrical signal, and transmit the electrical signal to the loudspeaker 1261. The loudspeaker 1261 converts the electrical signal to a sound signal and output the sound signal. In another aspect, the microphone 1262 may convert gathered sound signals to electrical signals. The audio circuit 1260 receives and converts the electrical signals to audio data and outputs the audio data to the processor 1280 for processing. The audio data processed by the processor 1280 may be transmitted to another mobile phone via the RF circuit 1210 or may be stored in the memory 1220 for further processing.

Wi-Fi is a short distance wireless communication technology. The mobile terminal may help the user to receive or send an e-mail, browse webpages, access to stream medium via the Wi-Fi module 1270. The Wi-Fi module 1270 provides wireless broadband Internet access service to the user. Although the Wi-Fi module 1270 is illustrated in FIG. 12, it may be understood that, the Wi-Fi module 1270 is not essential for the mobile phone 1200, thus it may be omitted according to demands.

The processor 1280 is a control center of the mobile phone, which utilizes various interfaces and wires to couple various parts of the mobile phone. By running or executing the software program and/or modules stored in the memory 1220, and by invoking data stored in the memory 1220, the various functions and data processing functions may be executed, thus integrally monitoring the mobile phone. In an embodiment, the processor 1280 may include one or more processing units. In an embodiment, the processor 1280 may be integrated with an application processor and a modem processor. The application processor mainly processes the operating system, a user interface and an application. The modem processor mainly processes wireless communication. It may be understood that, the above modem processor may be not integrated in the processor 1280.

The mobile phone 1200 may further include a power supply 1290 (such as a battery) for providing power to various components of the mobile phone. Preferably, the power supply may be logically coupled to the processor 1280 via a power management system, thereby managing charging, discharging and power consumption via the power management system.

In an embodiment, the mobile phone 1200 may further include a camera, a Bluetooth module and the like.

In an embodiment of the present disclosure, when the computer program is executed by the processor 1280 included in the mobile terminal, the image processing method according to the embodiments of the present disclosure is performed.

Any reference to the memory, the storage, the database, or any other medium as used herein may include a non-volatile memory and/or a volatile memory. The suitable non-volatile memory may include a ROM, a programmable ROM (PROM), an electrically programmable (EPROM), an electrically erasable programmable ROM (EEPROM) and a flash memory. The volatile memory may include a RAM, which is used as an external cache. As illustration and without limitation, RAM may be implemented in may forms, such as static RAM (SRAM), dynamic RAM (DRAM), synchronic DRAM (SDRAM), double data rate SDRAM (DDR SDRAM), enhanced SDRAM (ESDRAM), sync link DRAM (SLDRAM), memory bus (Rambus), direct RAM (RDRAM), direct memory bus dynamic RAM (DRDRAM), and memory bus dynamic RAM (RDRAM).

Above embodiments merely illustrate some implementations of the present disclosure, which are described specifically and in detail, but do not constitute limitation to the scope of the present disclosure. It is to be noted that, those skilled in the art may make several modification and change without departing from the concept of the present disclosure, and these modification and change belong to the protection scope of the present disclosure. Thus, the protection scope of the present disclosure is defined by appending claims.

What is claimed is:

1. An image processing method, comprising:
  acquiring a first face set, the first face set being acquired by performing face recognition on a first image set according to a first recognition model;
  in response to detecting a connection to a network, receiving a second face set sent by a server, the second face set being acquired by the server through face recognition on images in a second image set according to a second recognition model, a recognition precision of the first recognition module being lower than a recognition precision of the second recognition model;
  performing image matching on images in the first image set and the images in the second image set;
  processing the first face set according to the second face set and a result of the image matching; and
  classifying the first image set according to the processed first face set.

2. The method according to claim 1, acquiring the first face set further comprising:
  acquiring the first image set;
  compressing the images in the first image set; and
  performing the face recognition on the compressed images in the first image set according to the first recognition model to acquire the first face set.

3. The method according to claim 2, acquiring the first image set further comprising at least one of following operations:
  acquiring images from a preset storage address to generate the first image set; and
  traversing all folders of a terminal to acquire images and generating the first image set according to the acquired images.

4. The method according to claim 2, compressing the images in the first image set comprising at least one of following operations:
  compressing a size of each image in scale; and
  compressing a size of each image to a fixed size.

5. The method according to claim 2, performing the face recognition on the compressed images in the first image set according to the first recognition model to acquire the first face set comprising:
  traversing each image in the first image set; and
  extracting the face image from each image according to the first recognition model to generate the first face set.

6. The method according to claim 1, receiving the second face set sent by the server comprising:
  initiating a face image acquiring request to the server, the face image acquiring request carrying a terminal identification; and
  receiving the second face set returned by the server according to the terminal identification.

7. The method according to claim 1, receiving the second face set sent by the server comprising:
  acquiring a network type of the network;
  determining whether the network type is a preset network type;
  when the network type is the preset network type, receiving the second face set sent by the server.

8. The method according to claim 7, when the network type is the preset network type, receiving the second face set sent by the server comprising:
  when the network type is a data network, determining remaining data traffic of the data network; and
  when the remaining data traffic is greater than a traffic threshold, receiving the second face set sent by the server.

9. The method according to claim 1, each image in the first image set corresponding to an image identification and each image in the second image set corresponding to an image identification;
  performing the image matching on the images in the first image set and the images in the second image set comprising:
  performing the image matching on the image identifications corresponding to the images in the first image set and the image identifications corresponding to the images in the second image set.

10. The method according to claim 2, performing the image matching on the images in the first image set and the images in the second image set and processing the first face set according to the second face set and the result of the image matching comprising:
  acquiring any image in the first image set or the second image set as a target image;
  when the target image exists in both the first image set and the second image set, generating a first face subset comprising face images corresponding to the target image in the first face set and generating a second face subset comprising face images corresponding to the target image in the second face set;
  performing face matching on the face images in the first face subset and the face images in the second face subset; and
  processing the first face set according to a result of the face matching.

11. The method according to claim 10, performing the face matching on the face images in the first face subset and the face images in the second face subset comprising:
  compressing the face images in the second face subset; and
  performing the face matching on the face images in the first face subset and compressed face images in the second face subset.

12. The method according to claims 10, processing the first face set according to the result of the face matching comprising:
  acquiring any face image in the first face subset or the second face subset as a target face image;
  when the target face image exists in both the first face subset and the second face subset, replacing the target face image in the first face set with the target face image in the second face set;
  when the target face image exists in the first face subset and does not exist in the second face subset, deleting the target face image from the first face set;
  when the target face image exists in the second face subset and does not exist in the first face subset, adding the target face image in the second face set to the first face set.

13. The method according to claim 1, performing the image matching on the images in the first image set and the images in the second image set and processing the first face set according to the second face set and the result of the image matching comprising:
  acquiring any image in the first image set or the second image set as a target image; and
  when the target image exists in the second image set and does not exist in the first image set, adding a face image corresponding to the target image in the second face set to the first face set.

14. The method according to claim 1, classifying the first image set according to the processed first face set comprising:
  classifying the images corresponding to a same face and in the first image set into a same category.

15. The method according to claim 1, further comprising:
  in response to detecting no connection to a network, classifying the first image set according to the first face set.

16. The method according to claim 1, further comprising:
  sending an image download request to the server, the image download request comprising one or more image identifications corresponding to one or more images in the second image set;
  receiving the one or more images returned by the server according to the image download request; and
  classifying the one or more images according to the processed first face set.

17. The method according to claim 16, sending the image download request to the server comprising:
  receiving a message indicating a connection with the server is established from the server; and
  sending the image download request to the server.

18. The method according to claim 1, further comprising:
  synchronizing the images in the first image set by a terminal to the second image set of the server, when at least one following conditions is met:
  a number of images newly added to the first image set exceeding a preset number;
  a current time being a preset time;
  a time period from a time of last synchronization to a current time exceeding a preset time period and
  the terminal being in a charging state.

19. A computer device, comprising a memory and a processor, wherein a computer-readable instruction is stored in the memory, when the computer-readable instruction is executed by the processor, the processor is caused to perform the image processing method, comprising:

acquiring a first face set, the first face set being acquired by performing face recognition on a first image set according to a first recognition model;

in response to detecting a connection to a network, receiving a second face set sent by a server, the second face set being acquired by the server through face recognition on images in a second image set according to a second recognition model, a recognition precision of the first recognition module being lower than a recognition precision of the second recognition model;

performing image matching on images in the first image set and the images in the second image set;

processing the first face set according to the second face set and a result of the image matching; and classifying the first image set according to the processed first face set.

20. A computer-readable storage medium, having a computer program stored thereon, wherein when the computer program is executed by a processor, the processor is caused to perform the image processing method, comprising:

acquiring a first face set, the first face set being acquired by performing face recognition on a first image set according to a first recognition model;

in response to detecting a connection to a network, receiving a second face set sent by a server, the second face set being acquired by the server through face recognition on images in a second image set according to a second recognition model, a recognition precision of the first recognition module being lower than a recognition precision of the second recognition model;

performing image matching on images in the first image set and the images in the second image set;

processing the first face set according to the second face set and a result of the image matching; and classifying the first image set according to the processed first face set.

* * * * *